Sept. 15, 1953

C. M. HANNUM 2,651,889

APPARATUS FOR CUTTING MATERIALS

Filed Sept. 23, 1950

INVENTOR.
CHARLES M. HANNUM
BY
ATTORNEY.

INVENTOR.
CHARLES M. HANNUM
BY
*LaRue W. Yates*
ATTORNEY.

Sept. 15, 1953 C. M. HANNUM 2,651,889
APPARATUS FOR CUTTING MATERIALS
Filed Sept. 23, 1950 8 Sheets-Sheet 3

INVENTOR.
CHARLES M. HANNUM
BY
ATTORNEY.

Sept. 15, 1953   C. M. HANNUM   2,651,889
APPARATUS FOR CUTTING MATERIALS
Filed Sept. 23, 1950   8 Sheets-Sheet 4

INVENTOR.
CHARLES M. HANNUM
BY
ATTORNEY.

Sept. 15, 1953        C. M. HANNUM        2,651,889

APPARATUS FOR CUTTING MATERIALS

Filed Sept. 23, 1950        8 Sheets-Sheet 5

*INVENTOR.*
CHARLES M. HANNUM
BY
*ATTORNEY.*

Sept. 15, 1953 C. M. HANNUM 2,651,889
APPARATUS FOR CUTTING MATERIALS
Filed Sept. 23, 1950 8 Sheets-Sheet 6
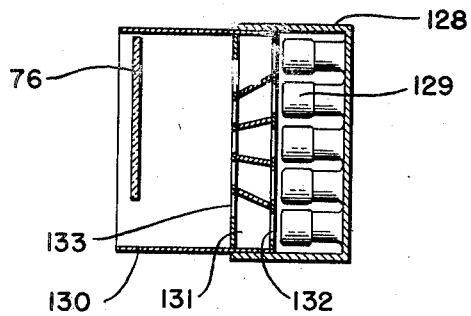
Fig. 11
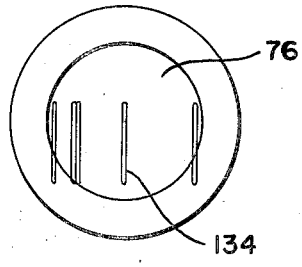
Fig. 15
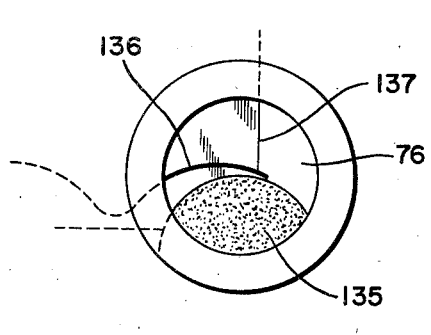
Fig. 16
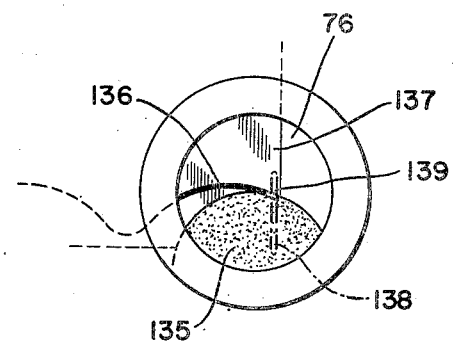
Fig. 17
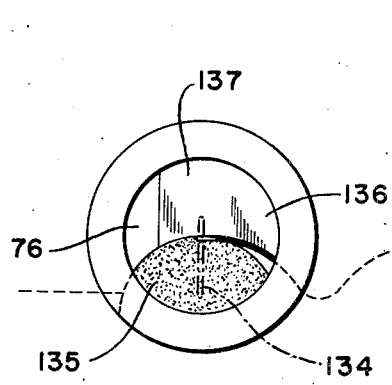
Fig. 19
Fig. 18
INVENTOR.
CHARLES M. HANNUM
BY
ATTORNEY.

Sept. 15, 1953             C. M. HANNUM             2,651,889

APPARATUS FOR CUTTING MATERIALS

Filed Sept. 23, 1950             8 Sheets-Sheet 7

INVENTOR.
CHARLES M. HANNUM
BY
ATTORNEY

Patented Sept. 15, 1953

2,651,889

UNITED STATES PATENT OFFICE 2,651,889

APPARATUS FOR CUTTING MATERIALS

Charles M. Hannum, Birmingham, Mich., assignor, by mesne assignments, to Kopti-Kat Company, Detroit, Mich.

Application September 23, 1950, Serial No. 186,465

10 Claims. (Cl. 51—100)

This invention relates to a method and apparatus for cutting materials and, in particular, it relates to an extremely accurate method and apparatus for cutting materials, such as metals, by cutting tools, such as rotary grinding wheels, milling cutters, and the like.

In accordance with the practice of my invention, I provide a method and apparatus for cutting materials such as metals wherein an optical system is used, capable of projecting on a screen a pair of superimposed images, one of which illustrates a pattern, and the other illustrates a cutting tool in cutting position with a work blank. The pattern may consist of a line drawing made many times larger than actual size. The pattern and the work blank are connected by a suitable pantagraph so that relative movement of the pattern will transmit such movement to the work blank in proportion to the increase in size of the pattern compared with the work blank. Means are provided to move the pattern with its accompanying relative movement of the work blank through the pantograph.

Since the image of the pattern and the enlarged image of the work blank in superimposed relation appear on the screen, it is merely necessary for an operator, through visual inspection of the screen, to manually manipulate the pattern, thus causing the work blank to engage the cutting tool and complete the cutting operation with that precision which is made possible due to the enlarged pattern forming a superimposed image on the screen coincident with the enlarged image of the work blank.

While the apparatus, as herein described, may be manually operated in combination with visual inspection, I also contemplate automatic operation in which photo-electric cells function in cooperation with the image on the screen to set into operation mechanism to control cutting of the blank in accordance with the outline of the pattern.

By reference to a pattern, I propose to use merely an accurate drawing defining the desired contour. In actual practice it is desirable to draw a pattern to a ratio of about 30 to 1. This is a substantially high ratio which enables the operator to follow the pattern quite easily, thus resulting in a high degree of accuracy in the finished product.

A principal advantage of my invention is that it is possible to reproduce contours with a high degree of accuracy. For example, according to the present method and apparatus for cutting materials I am able to reproduce dimensions within a tolerance of plus or minus 0.0001 inch.

Another advantage of my invention is that I am able to reproduce contours which take the form of regular curves or straight lines or combinations of radii, straight lines, angles, or irregular curves. With particular reference to irregular curves it is extremely difficult by conventional practice to reproduce such curves accurately. In the practice of my invention it is no more difficult to produce a precision irregular curved surface than it is to produce an accurate straight line finish.

A still further advantage of the present invention is that the operator need not be highly skilled to produce the accuracies herein defined. In fact, complicated irregular curved surfaces may easily be reproduced by any machinist without any special training in the operation of the particular apparatus. Still further, the operation of the apparatus may be completely automatic by the use of photoelectric cells in combination with the image as projected on the screen.

Another advantage is that operation is not limited to a grinding wheel, but may be used efficiently with any type of cutter, such as a milling cutter, fly cutter, or the like.

An additional advantage of the invention is that the operation may be performed on flat stock or round stock. When flat stock is used a rotary cutter may be moved in a reciprocal motion, vertical or angular. When round stock is used it is merely necessary to rotate the stock by any conventional means.

A still further advantage of my invention is that notwithstanding the high degree of precision the operation is relatively simple to perform, and the apparatus itself is practical to construct, efficient in operation, and relatively economical in cost.

Another advantage obtained by the device is that of speed of operation and its ability to compensate for wear which naturally results from the wearing away of the grinding wheel. The movement of the device is controlled by the intersection of the grinding face with the work.

These and other objects and advantages will appear more fully in the following detailed description when considered in connection with the accompanying drawings, in which:

Fig. 11 is a transverse view, in section, of the photo-electric cell adaptor taken along lines XI—XI of Figure 10;

Fig. 15 is a view of the image screen illustrating the position of reaction between the screen and the photo-electric cells; and Figs. 16, 17, 18 and 19 are views of the image screen in various stages of operation of the apparatus.

Figure 1:
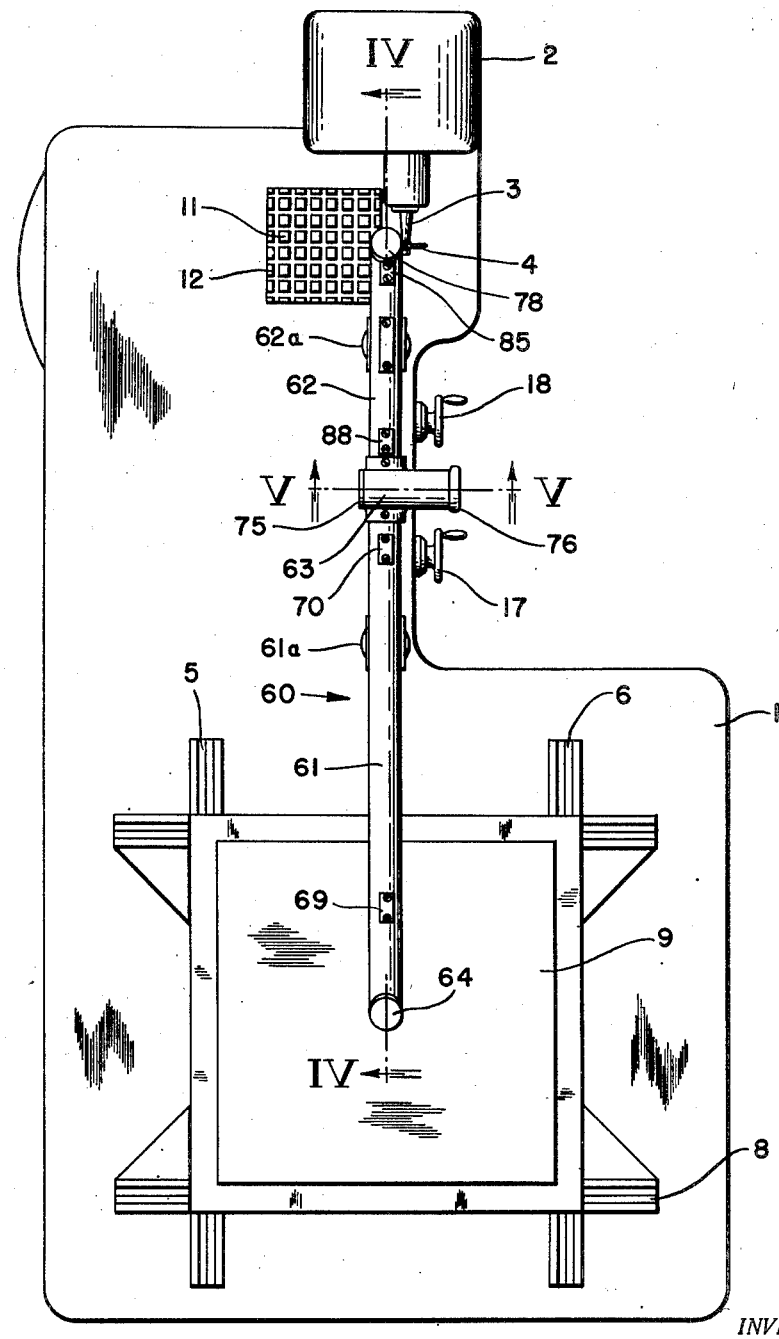
Fig. 1 is a top plan view of a cutting apparatus embodying the features of my invention.
Figure 2:
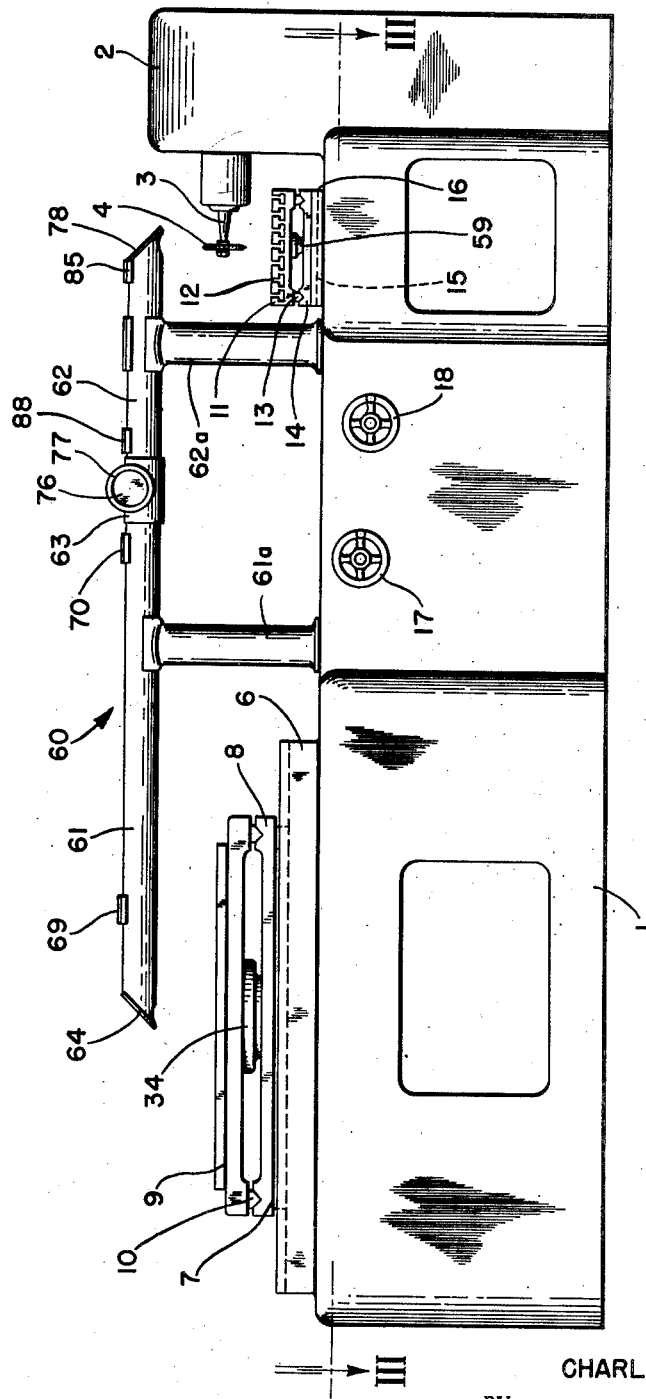
Fig. 2 is a front elevational view thereof.

With reference to the drawings and, in particular, to Figures 1 and 2, I show one form of an embodiment of my invention. In general, the invention includes a main frame 1 which, in accordance with general practice in conventional metal working machines, consists of a relatively large iron casting. Forming a part of or attached to the frame 1 is a housing 2 having a rotating spindle 3 projecting therefrom and a cutting tool 4 attached to the spindle. This housing 2 may contain all of those conventional mechanisms ordinarily required in the operation of a cutting tool. In the present example I illustrate the cutting tool in the form of a grinding wheel. It is to be understood, however, that this cutting tool may be in the form of various other conventional cutters such as milling cutter, fly cutter, or the like. It is also contemplated within the scope of this invention that the cutting tool and operating mechanism associated therewith may rotate about a fixed axis, or the axis itself may reciprocate on a vertical path while the tool is rotating on its axis, or still further, the cutter spindle may reciprocate in an angular path. All of these manipulations of the cutter are well known in the art, and, as such are not intended to form any part of the present invention except in the combination as hereinafter claimed.

Extending from the top of the frame 1 is a pair of bed rails 5 and 6. These rails include a V-shaped slot adapted for sliding engagement with a pair of slides 7 projecting downwardly from an intermediate template table support 8. This support 8 consists of a rectangular member having an open center, and having two spaced downwardly projecting slides 7 which engage with the bed rails 5 and 6. As a result of this assembly the intermediate template table support 8 is capable of horizontal slidable movement relative to the bed rails 5 and 6.

Positioned on top of the intermediate support 8 is a template of pattern table 9. This table includes downwardly extending V-shaped rails 10 which engage with complementary grooves positioned on top of the intermediate table 8. These rails 10 are positioned transversely relative to the position of the rails 7. Thus, the table 9 is capable of horizontal or transverse sliding movement, or any combination thereof. The effect of this assembly is to permit the table 9 to be moved in any direction in a horizontal plane.

The purpose of this table 9 is to position or fix to the table a pattern or template illustrating the shape of the object to be formed. This template or pattern should lie in a flat plane and may consist of a metal plate or other sheet on which the particular form or sheet of the product to be formed is marked. For practical purposes it is merely necessary to attach to the top of the table 9 a sheet of paper on which the pattern is drawn, and the lines of the pattern may be either in ink or pencil. The important requirement is that the pattern or template should be drawn substantially larger than the actual scale of the finished work. I have found that good results are obtained by providing a pattern which has a ratio of 30 to 1; that is, pattern should be drawn 30 times larger than the actual size of the finished product. It is to be understood, however, that this ratio is not critical, in that various other ratios may be employed; for example, satisfactory results may be obtained by using a ratio of from 10 to 1, or even 50 to 1. It should be further understood that an optical system, hereinafter described, must conform with the ratio selected and that once a ratio is determined as by the optical system it is essential that that ratio be maintained in drawing and preparing the size of the pattern to be used. There is positioned, also, above the top of the frame 1 a work table 11. This table 11 is located below the cutting tool 4, and includes a plurality of T-shaped cross slots 12 which are used as means to fasten the work piece of the table 11. The table 11, like the table 9, is capable of moving in all directions in a horizontal plane. This is accomplished by means of V-shaped rails 13 projecting downwardly from the table 11 and engaging with complementary slides in the top of an intermediate table support 14. Similarly, the support 14 includes downwardly extending rails 15 which engage with complementary slides in bed rails 16 mounted on top of the frame 1. The rails 13 and 15 are positioned at right angles to each other, thus making it possible for the table 11 to slide in any direction in a horizontal plane.

Two tables have now been described, one a template table 9 and the other a work table 11. The template table 9 is larger in size and is capable of greater movement. This is necessary because it is intended that the table 9, according to the present example, will move at a ratio of 30 to 1 in which the 1 represents the movement of the table 11.

The template table 9 is manually movable by an operator by means of hand control wheels 17 and 18. The hand wheel 17 moves the template table 9 in a horizontal direction along the length of the machine, while the hand wheel 18 moves the template table 9 in a transverse direction. Since the hand wheels 17 and 18 are operable independently of each other to move the table 9, it is apparent that the hand wheels 17 and 18 may be operated simultaneously so as to move the table 9 in any desired direction in a horizontal plane.

Figure 3:
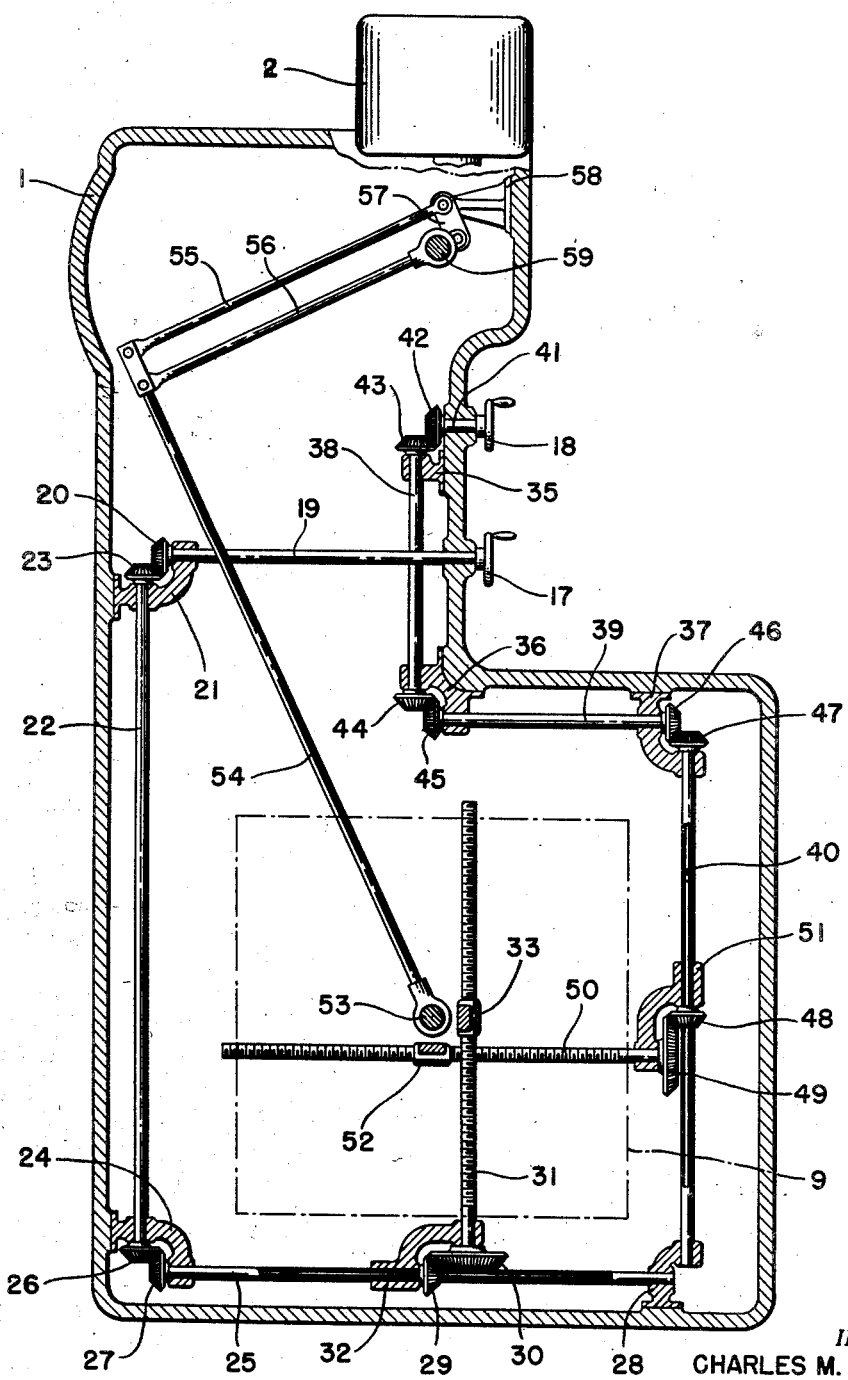
Fig. 3 is a top plan view, in section, taken along lines III—III of Figure 2.

The actual mechanism so moving the table 9 is illustrated more particularly in Figure 3. The hand wheel 17 is keyed to a shaft 19, and a bevel gear 20 is also keyed to the shaft. A bracket 21 extending from the frame 1 supports the gear end of the shaft 19. Also supported by the bracket 21 is a shaft 22 to which is attached a bevel gear 23 adapted to mesh with the gear 20. The opposite end of the shaft 22 is supported by a bracket 24 projecting from the frame 1. This bracket 24 also supports another shaft 25 at right angles thereto. A pair of intermeshing bevel gears 26 and 27 are keyed to the shafts 22 and 25, respectively. The shaft 25 at its opposite end is supported by a further bracket 28 attached to the frame 1 which also supports one end of shaft 40. Along the length of the shaft 25 is a bevel gear 29 which is slidably keyed to the shaft 25. This gear 29 meshes with a bevel gear 30 keyed to a threaded shaft 31. A movable bracket 32 forms a support for the shafts 25 and 31. The bracket 32 is longitudinally movable on the shaft 25. A special nut 33 is attached in fixed relation with the hub 34 (Fig. 2) which, in turn, is attached to the underside of the template table 9. As thus described, operation of the hand wheel 17 results in a movement of the table 9 in a horizontal direction along the length of the machine.

Similarly, the hand wheel 18 connects with the table 9 to produce a movement of the table 9 in a direction transversely to the movement produced by the hand wheel 17. This mechanism includes a plurality of brackets, 35, 36 and 37 each attached to the frame 1. These brackets support shafts 38, 39 and 40, the latter shaft being also supported in bracket 28. Further, a shaft 41 to which the hand wheel 18 is mounted drives a train of bevel gears 42, 43, 44, 45, 46 and 47. The shaft 40 includes a slidable keyway to which a bevel gear 48 is attached and meshes with a bevel gear 49 keyed to a threaded shaft 50. Another special nut 52 engages with the threaded shaft 50 and is attached to the hub 34 of the table 9. This completes the mechanical arrangement for operating the table 9. It is to be understood that there are various other mechanical devices by which this movement of the table 9 can be accomplished. The presently described construction is intended to be illustrative of one embodiment and it is not intended to constitute a limitation.

One of the objects of the present invention is to connect the template table 9 with the work table 11 in such manner that the template table will move in a predetermined ratio relative to the work table. As shown in Fig. 3, this is accomplished by means of a conventional pantograph. A pivot 53 forming an extension of the hub 34 (Fig. 2) joins with a rod 54 pivotally connected to a pair of parallel rods 55 and 56. These rods, in turn, are pivotally connected to a link 57 supported by a bracket 58 attached to the frame 1. The rod 56 includes a pivotal connection with a hub 59 attached to the work table 11. Thus, movement of the template table 9 is transmitted to the work table 11 in a reduced predetermined ratio of movement.

Positioned above the template table 9 and the work table 11 is a tubular housing 60 containing an optical system adapted to visualize and convert the difference of the predetermined ratio to a common scale. The housing 60 is supported by a pair of posts 61-A and 62-A attached to the top of the frame 1 and maintaining the housing 60 in a position above the template table 9 and the work table 11. The optical system, in general, includes a viewing screen and a dual light path, the two paths being capable of transmitting images in superimposed relation upon the screen. One light path originates directly above the center of the template table 9 in its normal position and the other path originates directly above the cutting edge of the cutting tool 4. Further, the hand control wheels 17 and 18 are positioned in close proximity to the viewing screen so that the hand wheels will be conveniently accessible to an operator while the operator is in proper position relative to the viewing screen.

Figure 4:
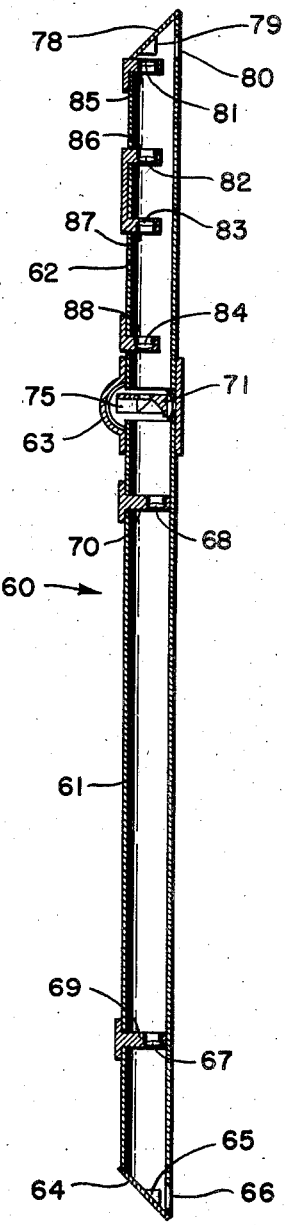
Fig. 4 is a longitudinal view, in section, of an optical system taken along lines IV—IV of Figure 1.
Figure 6:
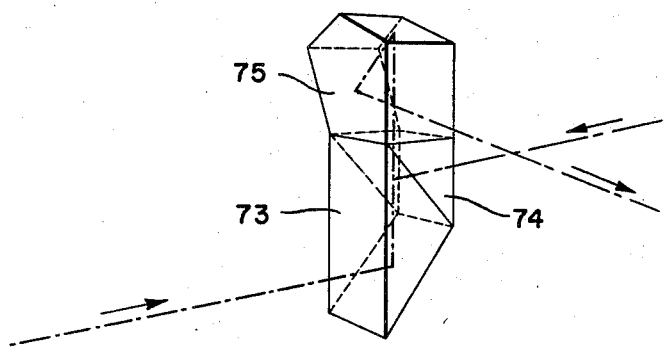
Fig. 6 is a perspective view of a prism assembly.
Figure 5:
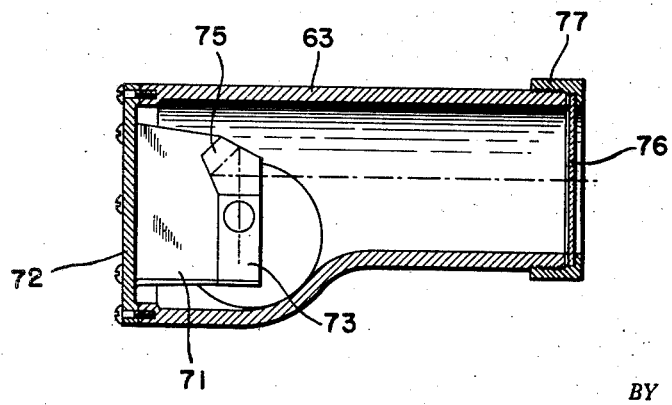
Fig. 5 is a transverse view, in section, of the optical system taken along lines V—V of Figure 1.
Figure 8:
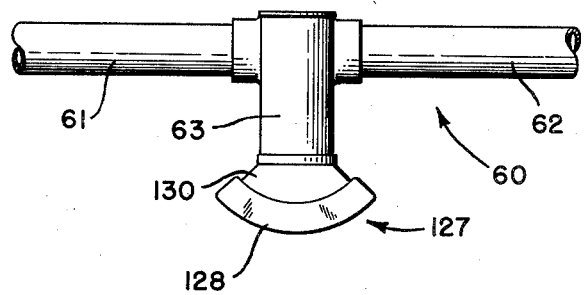
Fig. 8 is a top plan view of a portion of the optical system illustrating a modified form of the invention in the application of photo-electric cells in cooperation with the image screen.
Figure 9:
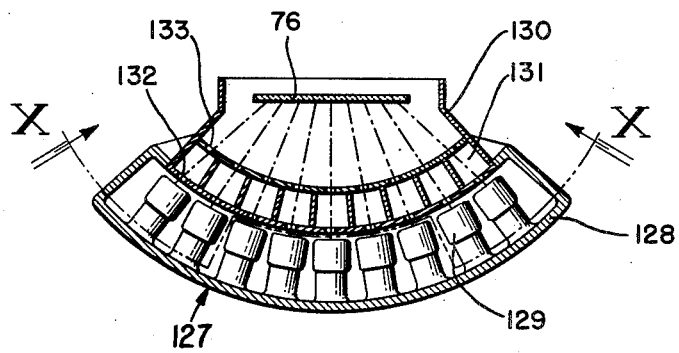
Fig. 9 is an enlarged view, in section, of a photo-electric cell adaptor.

The housing 60 is divided into two parts, a long tube 61 and a short tube 62 (Fig. 4). These are joined together by an intermediate housing 63 (Fig. 5), the main body of which is tubular in form and extends at right angles relative to the housing 60. The outer end of the tubular member 61 is inclosed by a 45 degree positioned end plate 64. Attached to this end plate 64 is a prism 65. An aperture 66 is located in axial alignment with the center of the template table 9, when the template table is in its normal or neutral position. A pair of lenses 67 and 68 are mounted in retainers 69 and 70, respectively. These retainers extend through openings in the tubular member 61 at fixed spaced distances and are attached to the tubular member 61. Within the housing 63 is a bracket 71 attached to a cover plate 72 which, in turn, is fastened to the housing 63. The bracket 71 supports a compound prism which, as shown in Fig. 6, consists of three separate prisms 73, 74 and 75. The purpose of these prisms is to deflect the range from the lenses 67 and 68 to a vertical range and thence to a range at right angles to the range devised by the lenses 67 and 68. This deflection of the rays throws an image on a ground glass screen 76 secured to the tubular end of the housing 63 by means of a retainer ring 77.

As thus far described, the optical system projects an image appearing at the center portion on top of the template table 9 to the ground glass screen 76. This image path extends to the prism 65 where the ray is turned 90 degrees, thence through the lenses 67 and 68 to the prisms 73, 74 and 75 where the image path is turned again 90 degrees to an upward vertical position where the multiple surface prism 75 again changes the path 90 degrees to throw an image on the screen 76. The lenses 67 and 68 do not result in any magnification of the rays but maintain a ratio of exactly 1 to 1. The invention also contemplates a design where a ratio of magnification is maintained between the right hand optical system and the left hand optical system of 30 to 1 (or equal to the pantograph ratio). For example, the 30 to 1 ratio may be accomplished by making the left hand side 2 to 1 and the right side 60 to 1 which leaves the final ratio 30 to 1 or equal to the pantograph ratio.

The shorter tubular housing 62 is provided with a 45 degree end plate 78 which supports a prism 79. An opening 80 in the tubular member 62 is directly in vertical alignment with the cutting edge of the tool 4. Within the tubular housing 22 and in alignment with the prism 79 are a plurality of lenses 81, 82, 83 and 84. Each of these lenses are mounted in retainers 85, 86, 87 and 88 respectively. The retainers, in turn, extend through openings in the housing 62 and are attached to the housing 62. These lenses are of such characteristics and are so positioned as to provide a magnification in the predetermined ratio of pantograph movement as selected on the template. As shown in Fig. 6, the ray from this group of lenses enters the prism 74 and projects vertically upward into the prism 75 and thence horizontally and at right angles to the lens path to form a superimposed image on the screen 76. The mixing of the rays from the two separate lens system is accomplished with a very thin film of silver or other coating set in the system between the two 45 degree prisms 73 and 74. The path of the rays now extend from the cutting edge of the tool upwardly to the prism 79 where the rays turn at a 90 degree angle and project through the system of lenses 81, 82, 83 and 84, and thence through the prisms 74 and 75, and to the screen 76. It is intended that the lens system 81—84 will magnify the area at the edge of the cutting tool 4 in the ratio of 30 to 1. This is identical to the ratio of movement between the template table 9 and the work table 11 as produced by the pantograph hereinbefore described.

Figure 7:
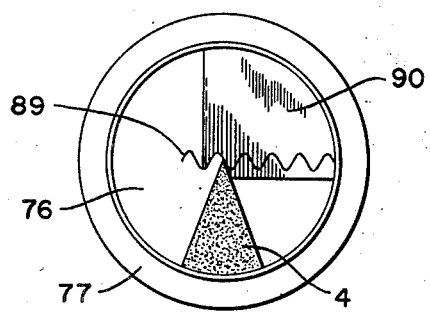
Fig. 7 is a view of an image screen showing the images when the machine is in operation.

Figure 7 shows a view as appearing on the ground glass screen 76. In this view is illustrated a template line 89. If the ratio of 30 to 1 has been selected this is thirty times a full size drawing of a desired curve or shape to which a resulting work is intended to conform. This shape 89 will appear on the screen merely as a line such as a pencil line produced by a draftsman on a sheet of paper, except that the line 89 is exactly thirty times actual size of the finished workpiece. Superimposed on the screen at the same time, and magnified to the predetermined ratio as 30 to 1 is a work piece 90 and the cutter tool 4. This view illustrates the simplicity of the operation of the apparatus. It is merely necessary for the operator to rotate the manual control wheels 17 and 18 which, in effect, will move both the template line 89 and the work piece 90 in proper and desired relationship with the cutting edge of the tool 4. With this high degree of magnification and by merely watching the screen 76, an operator can easily present the template line 89 and the work piece 90 to the cutting tool with such precision as to obtain accuracy of the finished work piece within a tolerance of plus or minus 0.0001 inch.

In setting up the machine for operation, it is to be understood that the template or pattern may be a sheet of paper with the template line 89 marked thereon and that this sheet of paper may be laid on or adhered to the top surface of the template table 9 at approximately the center thereof. The work piece 90 is fastened down the work table 11 with bolts or clamps in accordance with conventional practice in securing work pieces for machine operations.

As noted, particularly in Fig. 7, the cutting edge of the tool 4 is exactly at the center of the screen 76. This means that the point of cutting will be transmitted through the axial optical center of the lens path. It is recognized that most lenses because of defects in the lens itself, aberration or other physical phenomena associated with lens systems are unable to reproduce images with great accuracy at those areas of the lens remote from its exact center. Since the present mechanism produces a cutting operation in conformity with substantially the exact optical center of lens system, it is possible to overcome even the slight distortion obtained in high grade lenses, thus making it possible to produce a finished article with extremely high accuracy.

In the actual grinding or cutting operation it is to be understood that a certain amount of light will be present over the template and over the work table. The ordinary amount of light present in a room will usually be sufficient for this purpose. However, additional light at these locations may be advantageous. The ground glass screen will appear to the operator as illustrated in Fig. 7. Due to the high magnification and the variation in color, the grinding operation may be easily followed. In color, the grinding wheel 4 will probably be red, the template line 89 is preferably black, and the metal of the work blank 90 will reflect its true metal color. Fig. 7 shows the grinding operation being accomplished from left to right on the blank. However, this may be reversed depending upon the wishes of the operator. In fact, if the operator desires he can start the grinding operation in the middle and work to the right and then come back and work to the left. Further, if desired, the operator can go through quickly with a rough grinding operation and then start over again to do an accurate finish job.

At the end of the grinding operation the operator may withdraw the grinding wheel completely from the field of view, and the final inspection may be accomplished by moving the work blank across the screen and comparing it with the template line which moves with the blank. If any spots need touching up the operator merely moves the grinding wheel back into approximate position and does the touching up.

It is to be understood that the work table may also include a work blank support such as spaced axially aligned centers which will permit the work blank to be rotated during the cutting or grinding operation. It is now believed apparent that various shapes or irregular curves may be cut into metal stock with the same accuracy as in producing straight line finishes, and that this invention lends itself to the cutting of materials with special contours to an exactness which heretofore has been extremely difficult to obtain.

While the foregoing method of cutting metal stock depends on the operator's vision and manual control, I also contemplate within the spirit of my invention and as a modification thereof, an automatic movement of the template table in combination with an electronic method of operating the controls based on the image projected on the ground glass screen. When the machine is set up for automatic operation it is merely necessary for the operator to set the machine for the start of the operation and it will continue the cycle of operation until the work is complete.

One of the features which allows automatic operation is the fact that two colors when superimposed one upon the other produce a third color which may be distinguished by automatic means, such as a color sensitive photo-electric cell.

Figure 12:
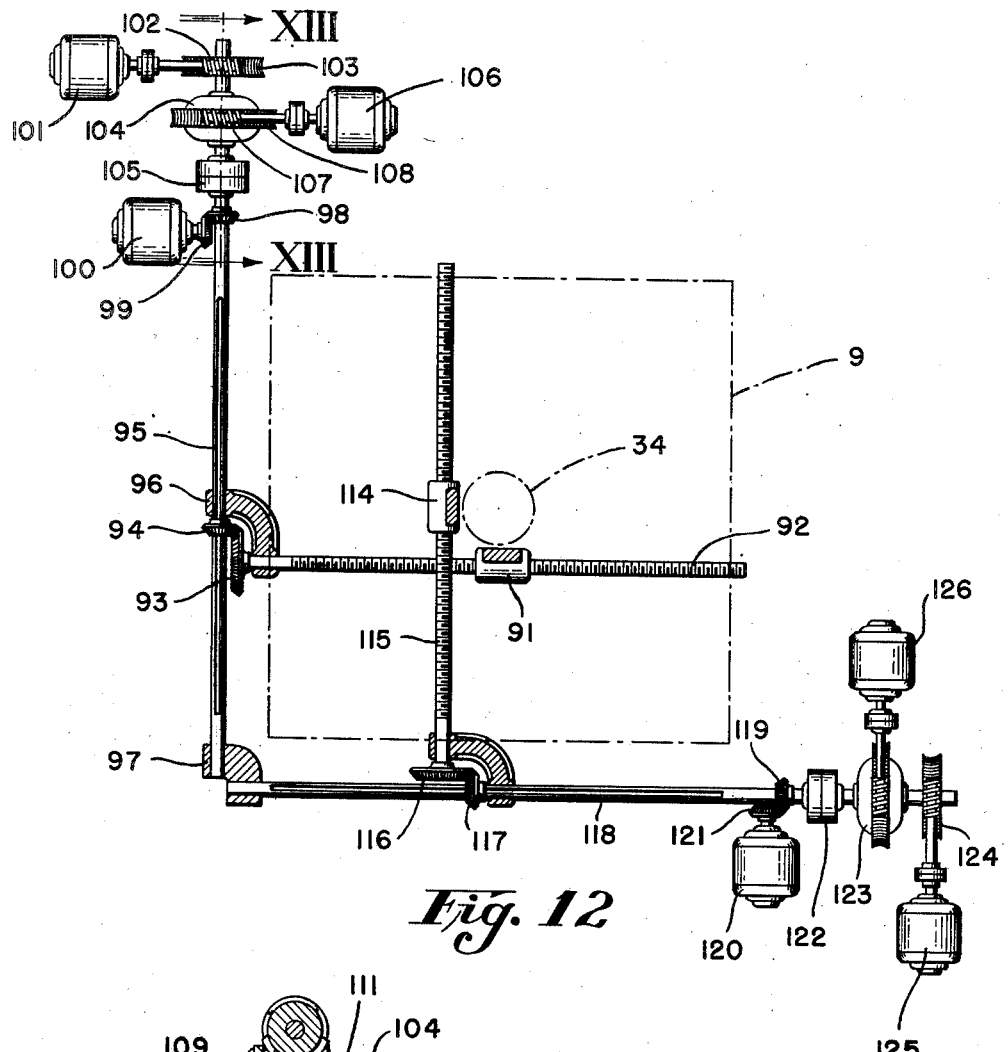
Fig. 12 is a modified form of automatic driving means for actuating a pattern or template board.

Automatic operation requires a suitable drive to move the template table. An example of such a drive is shown in Fig. 12. This plan view, while somewhat diagrammatical, illustrates the principle in which the template table is moved. The automatic operation utilizes the same mechanism as heretofore described with the exception that the hand controls associated mechanism for moving the template table 9 are replaced with the automatic table moving mechanism shown in Fig. 12. Connected with the hub 34 attached to the template table 9 is a special nut 91 threaded to a shaft 92. One end of the shaft 92 is keyed to a bevel gear 93 which meshes with a bevel gear 94 slidably keyed to a shaft 95. A bracket 96 maintains the shafts 95 and 92 in proper relative position. A bracket 97 supports one end of the shaft 95, and this bracket may be attached to the main base, such as the frame 1. The opposite end of the shaft 95 is provided with a bevel gear 98 keyed to the shaft and meshing with a bevel gear 99 attached to reversable electric motor 100. This motor provides a direct drive for moving the table 9 in one of two directions. The purpose of this motor 100 is only for rapid traverse at the start and finish of actual cutting operations.

Two other motors are used to provide movement of the table during the actual grinding operation. Motor 101 is a constant speed motor which, through a worm 102 and worm wheel 103, drives a differential 104. The differential, in turn, is connected to the drive shaft 95 through a magnetic clutch 105. When the motor 100 is in operation the magnetic clutch 105 is disengaged, but becomes engaged when the motor 100 is inactive and the motor 101 is in operation. An additional motor 106 through a worm 107 and worm gear 108 functions to rotate the differential 104. The motor 106 is a variable speed motor and is controlled by electrical means, hereinafter described, associated with the image on the ground glass screen.

Figure 13:
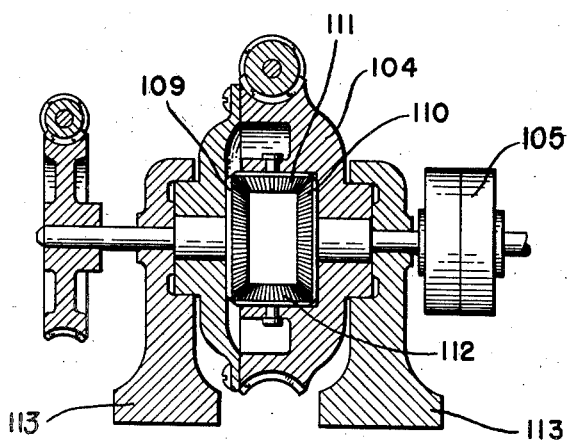
Fig. 13 is a view, in section, of a differential mechanism taken along lines XIII—XIII of Figure 12.

Fig. 13 illustrates a sectional view through the differential 104. This differential is in accordance with conventional design including a pair of bevel gears 109 and 110 which mesh with a pair of crown gears 111 and 112. Brackets 113 support the differential from an adequate support, such as the frame 1.

Consideration of the mechanics of this drive show that both motors 101 and 106 can be running when the template table is standing motionless. In fact, the motion of the table can be started, stopped, reversed, speeded up, or slowed down while both motors are continuously running in the same direction. All of these table motions are accomplished by merely varying the speed of the differential drive motor 106 while it runs in only one direction of rotation. This is very advantageous since it does not require intermittent starting and stopping of the motors, thereby resulting in smoother operating movements of the table and preventing back-lash troubles.

As thus described, one directional movement of the table 9 is accomplished. In order to move the table in a transverse direction a similar mechanism is employed. For purposes of identifying these parts reference may be had to a special nut 114, threaded shaft 115 and bevel gears 116 and 117. A splined shaft 118 connects with bevel gear 119 and to a direct drive motor 120 through a bevel gear 121. Shaft 118 couples with magnetic clutch 122, differential 123, and worm gear 124 to a constant speed motor 125. The differential itself is driven by variable speed motor 126, thus completing the movement of the table in a transverse direction to that driven by motors 101 and 106. By the foregoing arrangement, it is to be understood that the table 9 may be moved in one direction or transverse thereto, or in any combination thereof. The table movement, therefore, will be identical to that described in the previous modification which is operated manually, except in the present case the table is operated mechanically and by electrical means, as hereinafter described.

An automatic color sensitive means is utilized in combination with the image screen 76 in place of the visual means, hereinbefore described, in connection with the manual method of operation. This automatic means is exemplified in Figures 8, 9, 10, and 11. Essentially, this comprises a photo-cell control unit 127 adapted to form a light tight enclosure adapted for engagement with the housing 63 of the optical system.

Figure 10:
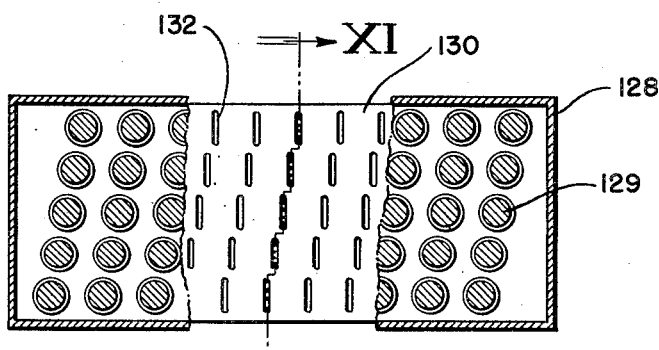
Fig. 10 is a developed view, in section, of the photo-electric cell adaptor taken along lines X—X of Figure 9.

In general, the control unit 127 (Fig. 9) includes an enclosure 128 which functions as a support and container for a plurality of color sensitive photo-electric cells 129. Associated with the enclosure 128 is a light ray direction control housing 130. It is this housing 130 which connects directly with the housing 63 of the original optical system. The control housing 130 includes a plurality of compartments 131, and apertures 132 and 133 extending through the walls of the compartment 131 at predetermined locations. These apertures are in the form of slots, such as shown in Fig. 10, and which represent a field of vision as indicated by the slot coverage areas 134 on the screen 76, as shown in Fig. 15. Also, as shown in Fig. 15, it is only necessary that the slot coverage should be adequate to cover substantially the entire lower half of the screen 76. In order to accomplish this, it is necessary to utilize a bank of photo-cells 129. I have found that for practical purposes a bank of 45 photo-cells is adequate to provide a number of adjacent slot coverage areas 134 of sufficient number so that when lying adjacent to each other they will extend across the entire diameter of the screen 76. Since it is not possible to place all of the photo-cells in a single row I find that utilizing five rows in which the photo-cells and slots 132 and 133 are positioned in progressive spacing increments I am able to obtain the coverage desired. This spacing is shown, in particular, in Figures 10 and 11.

As before stated, the photo-cells are color sensitive. In the present case, the cutting tool is in the form of a grinding wheel and, in this example, it is red in color. It is proposed that the template line will be blue. Neither red nor blue will actuate the selected photo-cell. It is only the color produced by the red and blue combination which will cause a reaction of the photo-cell. It is to be understood that these colors are only exemplary and that various other color combinations may be utilized. It is also to be understood that if other cutting tools are used, such as a milling cutter, it may be specially colored to accommodate the conditions herein required. Each of the photo-cells is connected with a relay and wiring circuit, hereinafter described, for operating variable speed motors 106 and 126.

Figure 14:
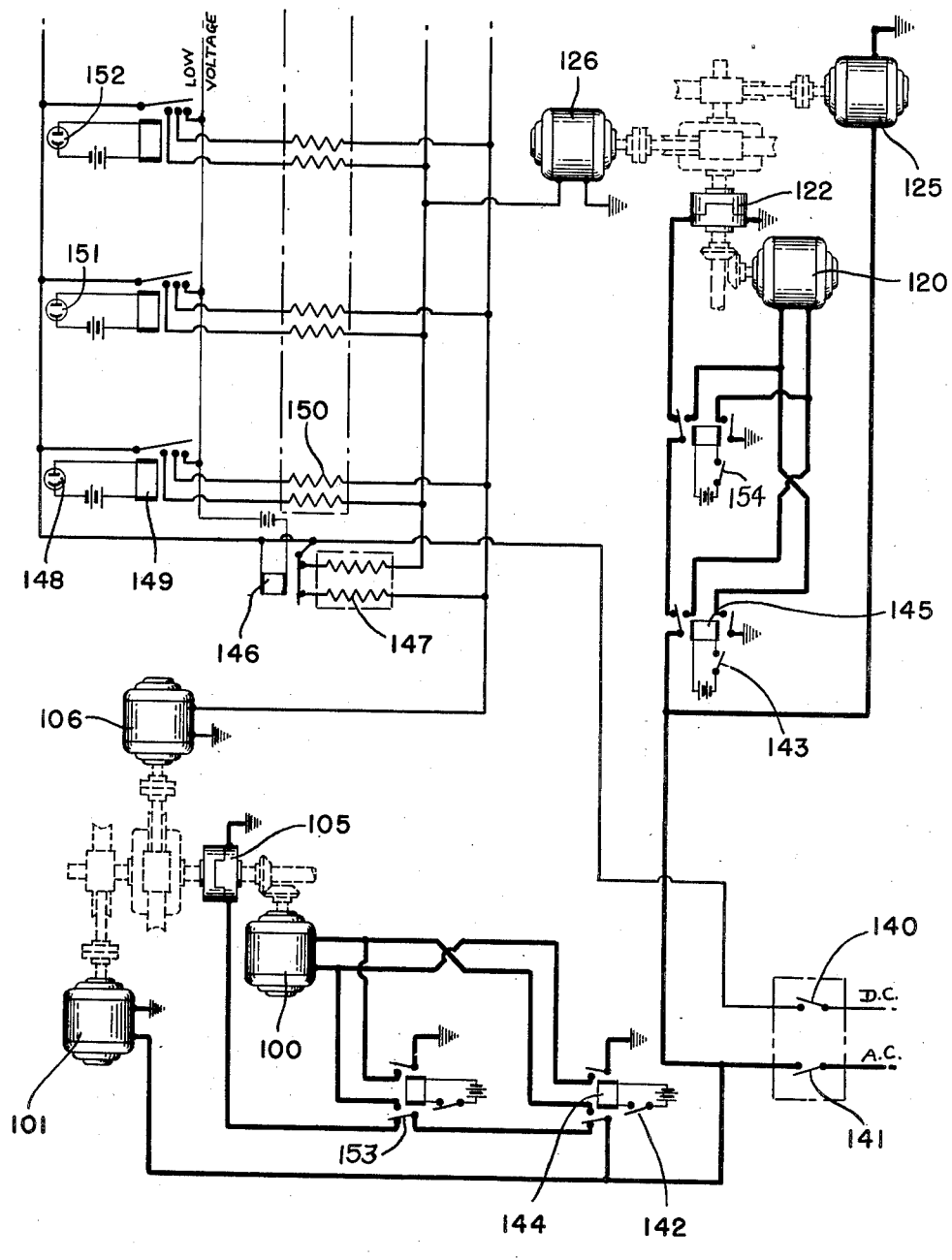
Fig. 14 is a wiring diagram illustrating the method of operating the mechanism, as shown in Fig. 12, in combination with the photo-electric cells.

Figure 14 illustrates a simplified schematic sketch of the electrical control system for operating the machine. The circuit has been reduced to maximum simplicity for illustrative purposes. As shown in the drawing, there are three general types of circuits, alternating current, direct current, and low voltage.

The alternating current circuit is the main energy supply for the entire machine, it will actuate all equipment not otherwise mentioned. It is to be noted that the alternating current energizes the two constant speed motors 101 and 125, the two rapid transverse motors 100 and 120, and the two magnetic clutches 105 and 122. In addition, and not shown in the drawing, alternating current will be used for the grinding wheel drive and for illuminating purposes.

As shown in Fig. 14, direct current is used to actuate the two variable speed motors 106 and 126. Low voltage is used for the relay circuits. They are shown as battery powered with mechanical relays. However, alternating current electron tubes may be used as well as mechanical relays.

Before completing an explanation of the wiring circuit, as shown in Fig. 14, it is believed more advantageous to discuss the actual functional operation of the grinding wheel and the work piece. This is shown, in particular, in Figures 16, 17, 18 and 19. These figures show the general system of automatic operation as appearing on the screen 76 and as presented to the bank of photo-cells 129. Fig. 16 shows the situation at about the time the rapid transverse motors 100 and 120 cut out and actual grinding is ready to commence. The photo-cells would "see" a red grinding wheel 135 and a blue template line 136 close together but not touching. The work blank is indicated by 137. Neither red nor blue will actuate any one of the photo-cell relays. Under these circumstances the table drive motors 106 and 126 and 101 and 125 will produce a slow in-feed and a slow cross-feed to the right.

Figures 17 and 19 show how a color change will result at various places as the red wheel reflected light engages the reflected light of the blue template line. It is now evident that certain slot areas, such as 138, will pick up the color changes wherever they may occur and actuate relays to control the table feed variable speed drive motors. The color change of the various slots will result in changes of the speeds of the variable speed drive motor 106 or 126 connected to the template table 9.

Each of the photo-cells is provided with a preselected resistor 150 and these resistors are arranged in block formation as in a single panel which may be removed as a unit and replaced by another set of resistors. The selection of resistors is predetermined by the trimmed radius of the grinding wheel and control of cross feed and in feed of the table. If the edge of the grinding wheel is trimmed to $\frac{1}{32}$ inch diameter, there will be one set of resistors. For a trim of $\frac{1}{16}$ inch radius there will be a different set of resistors. Any given radius of wheel trim will have its own set of resistors.

Referring to Fig. 14 it will be seen that there are two resistors for each photo-cell, one for controlling the in feed motor 126 and the other the cross feed motor 106.

Perfect grinding is accomplished when the template contour line is apparently just tangent with the tip radius of the grinding wheel. Hence, regardless of the momentary radius of curvature of the template contour at any given point, all table motions must be suited to the point of tangency with respect to the center line of the grinding wheel. Therefore, definite points of tangency require certain definite ratios of cross feed and in or out feed. These constant speed ratios are governed by the resistors, the machine constants and the differentials.

When contact (color change) shifts from one slot to another due to the configuration of the wheel contour and the template contour, the cross feed and in or out feed must be controlled. Therefore, certain positions of color change require certain subsequent and definite table motions. These may be tabulated as follows in the device selected for illustrating one form of the invention.

| Slot No. | Cross-Feed | In-Feed | Out-Feed |
| --- | --- | --- | --- |
| 1 | Minimum | 0 | Maximum. |
| 2 to 22 | Increasing | 0 | Decreasing. |
| 23 | Maximum | 0 | 0. |
| 24 to 44 | Decreasing | Increasing | 0. |
| 45 | Minimum | Maximum | 0. |

A general analysis of the above action of the photo-cells show that each photo-cell (combined with its own two slots) will give a definite table action as regards speed of table travel and direction of table travel. Since the cross feed and the in-out feed work together at all times we can accomplish curvilinear motion in the plane of the work table. It will be seen that in order to effect proper cutting to the desired shape, the outer edge of the grinding wheel must just come in co-incidence with the template line. Regardless of the curve of the template line or the form of the cutting tool (grinding wheel)—both curves must be brought into tangential relationship. Since the curve of the cutting tool can be pre-set by the diamond trimmer usual on all grinding machines, it follows that the drive characteristics of the photo-cell control can be pre-set to conform to the shape of the grinding wheel. That is to say, for any given shape of cutting tool, a tangential contact (or co-incidence) with any template curve (or whatever nature of waviness) can result in tangency at only one point. It follows mathematically that the position of the point of tangential contact to the right or to the left of the center will require fixed relationships of table travel to maintain continuous tangential contact.

It will now be noted why it is only necessary to cover the lower portion of the screen 76 with the slot areas 134 visible to the photo-cells. Contact between the grinding wheel and the blue template line can take place only in such lower portion due to the fixed position of the rounded nose of the grinding wheel relative to the screen 76.

Beginning with Fig. 17, an examination may be made of the actual instantaneous conditions of grinding by fleeting color changes in any particular section of the lower portion of the screen. In Fig. 17 it will be noted that a portion of the blue template line 136 becomes superimposed upon the grinding wheel 135. As a result of this condition, a color change takes place at this point indicated by 139. It will be noted that the slot 138 requires some in-feed. Areas 138 will pick up this color change and set the controls in operation to effect proper movement of the work blank 137 to accommodate this characteristic. It is obvious that in-feed must slow down and there must be cross-feed in order to maintain proper grinding operation. Accordingly, the photo-cell which controls the slot area 138 is adjusted to accommodate this condition.

Fig. 18 shows contact, or color change, at the exact middle of the grinding wheel, and this is covered by photo-cell slot area 134. At this moment it is obvious that there must be neither in-feed nor out-feed, but there should be maximum cross-feed to the right. All color changes at slot position 134 will always demand this combination of table drives regardless of template form.

It is to be understood that each photo-cell, in combination with its projected slot area and the resistors which control motor speed will give a definite table action as regards speeds of table travel and direction of table travel. Since it is possible to have cross-feed and the in-out-feed work together at all times there may be accomplished a curvilinear motion in the plane of the work table. It will be seen that in order to effect proper cutting to the desired shape, the outer edge of the grinding wheel must just come in coincidence with the template line. Regardless of the curve of the template line or the form of cutting tool, both curves must be brought into tangential relationship. Since the curve of the cutting tool can be pre-set by a diamond trimmer, usual on all grinding machines, it follows that the drive characteristics of the motors as controlled by the resistors which are actuated by the photo-cells can be pre-set to conform to the shape of the grinding wheel. That is to say, for any given shape of cutting tool a tangential contact with any template curve can result in tangency at only one point. It follows mathematically that the position of the point of tangential contact to the right or the left of the center will require fixed relationships of table travel to maintain continuous tangential contact.

It should be noted, however, that in grinding operations of this general type, it is obvious that the radius pre-set on the grinding wheel must be smaller than the smallest radius desired on the finished work. Otherwise it would be impossible to accomplish the desired work under this or any other method of contour cutting system.

It is now believed apparent that any breakdown on the grinding wheel during its operation will have no effect on the finished accuracy of the work. As long as the actual edge of the grinding wheel maintains tangential coincidence with the template line, then the finished work must be a duplicate of the template line.

Another condition that should be considered is that a grinding wheel gives rise to sparks when cutting metal. In such case, the rotation of the wheel is such that the sparks fly away from the optical system. At the same time, it is also apparent that light from sparks will show up on the viewing screen. The color of the template line must be chosen in relation to the color of spark light as well as the color of the grinding wheel.

With reference to the drawing 14 illustrating the circuit diagram, the first requirement to set the machine in operation is actuation of the switches 140 and 141. This energizes both constant speed motors 101 and 125 through the alternating current circuit, at the same time switch interlocks will also energize switches 142 and 143 as well as relays 144 and 145. Relays 144 and 145 will energize the two rapid traverse motors 100 and 120 in the approach direction. At the same time they will de-energize both magnetic clutches 105 and 122. Hence, the template table will cause the work table to bring the blank into cutting relation with the grinding wheel since the work table is moved by the pantagraph.

The switch interlocks may be either mechanically or electrically operated, but are simultaneously controlled by the operation of a single control for switches 140 and 141. While this operation is in process the direct current circuit is also energized. However, since the magnetic clutches have been de-energized rotation of the variable speed motors 106 and 126 has no effect on table travel.

After a few seconds of rapid traverse motion in the approach direction, limit switches 142 and 143 will be tripped by the template table a fraction of an inch before the grinding wheel touches the work blank. Switches 142 and 143 will de-energize the two rapid traverse motors and immediately energize the two magnetic clutches. At this moment the template table begins to move under control from the two variable speed motors 106 and 126 rather than from the rapid traverse motors 100 and 120. Operator adjusts location of limit switches with reference to the contour or design of the work or physical dimensions of the work blank in his initial set up of the machine.

At this stage the grinding wheel is not yet engaged with the work blank. Obviously, at the same time, the optical system has not begun to function. At this period of the cycle the variable speed motors 106 and 126 are running idle with their speeds controlled by a normally closed relay 146 and a resistor block 147 carrying two resistance coils, one to the variable speed motor 106 and another to the variable speed motor 126. Each resistor coil is precalculated to give zero cross-feed and very slow in-feed. In this way, the grinding wheel is approached very slowly by the work blank, and, after a few seconds, actual grinding commences.

The optical system has not yet begun to function. The optical system functions only when the image of the edge of the wheel just touches the image of the template line. Since gradual in-feed will eventually bring the wheel edge image in contact with the template line image a color change will take place and one of the photocells will begin to operate.

Assuming that the first color change appearing on the optical screen is covered by photo-cell 148, the color change will energize the photo-cell and close relay 149. This relay will energize the low voltage circuit to relay 146 and take over control away from resistor coils in the resistor block 147, and at the same time, however, relay 149 will also energize the two variable speed motors 106 and 126 through resistors 150. While only part of the circuit of photo-cell relays and resistors is shown, it is to be understood that I have herein illustrated 45 such units all identically wired, with each cell having its appropriate relay as well as resistance coils, one for each variable speed motor 106 and 126. However, any number of units may be used depending upon the accuracy required.

The grinding operation now proceeds under control of the photo-cell bank combined with their respective controls. As color changes shift around in the optical field of view, control will shift from cell 148 to 151 to 152 and through the rest of the 45 cells as determined by the template contour. Each photo-cell will give predetermined rates of table travel in all directions. Cross-feed will increase, decrease, and stop, but will not reverse. In and out-feed will increase, decrease, stop and reverse whenever demanded by the proper photo-cell. In this manner grinding will eventually be completed with the grinding wheel following around the template contour.

At the completion of actual grinding, the limit switches 153 and 154 will be tripped by the template table, and the rapid traverse motors 100 and 120 will again be energized while the magnetic clutches 105 and 122 are de-energized, thus the template table is free from control by the variable speed motors, and the rapid traverse motors will return the table to the loading-unloading position. It will be noted that switches 153 and 154 run the rapid traverse motors 100 and 120 in the reverse direction as compared to switches 142 and 143.

At the loading-unloading position the template table will trip inter-lock switches which will de-energize the entire circuit at the main switches 140 and 141. The machine is now stopped, all circuits are de-energized and the equipment is ready for unloading and subsequent loading.

In further reference to Fig. 14 it will be noted that the alternating current and direct current circuits have been grounded in order to simplify the wiring diagram. On the other hand, for the same reason, the low voltage control circuits have been shown as closed ungrounded circuits. The alternating current circuit has been shown of the two-phase type merely for the sake of simplicity. Hence, the main switches 140 and 141 merely show single knife blades, one each for alternating current and for direct current.

The resistor unit 147 with its two coils will always result in zero cross-feed and very slow in-feed. This assures that the grinding wheel will always meet the work blank properly, and further assures that the image of the grinding wheel will eventually meet the image of the template contour line. This will result in a color change that will shift control over to the photo-cells and resistors, such as 150. If at any time control is lost by the photo-cells, then relay 146 will immediately return control to the resistor 147 until control is regained by the photo-cells.

The precalculated resistances, such as 150, are determined by the radius originally trimmed onto the tip of the grinding wheel. Thus, if the edge of the wheel is trimmed to $\frac{1}{32}$ inch radius there will be one set of resistances. Any different radius of wheel trim will require its own set of precalculated resistors.

It is to be understood that the image of the tool is actually the follower so that as the tool changes shape, due to wear, there is always maintained an accurate reproduction. As the grinding contact moves across the radius of the cutting tool during movement of the parts, the point of tangency shifts from one photo-cell to another, thereby causing the desired movement of table direction. At all times the template follower conforms to the shape of the cutting tool. While it is true the device follows a master with a follower it is to be clearly understood that the image of the tool is used as the master follower; whereas, heretofore the follower has been distinct and separate from the tool.

As thus shown and described, it is believed apparent that I have provided a novel method and machine for cutting materials, and that this machine is particularly useful because of its high degree of accuracy in the cutting operation, and because of its high degree in accuracy in cutting irregular curved profiles. The device herein disclosed, either in the manually controlled operation or the automatic, provides speed of operation as compared to conventional methods of forming and reduces production costs.

It is also believed apparent that the machine is unique and that it lends itself to either manual operation or automatic operation. While the automatic operation has been exemplified by the use of color sensitive photo-electric cells, it is to be understood that other color sensitive electronic methods may be employed in the reproduction operation without departing from the spirit of the invention.

While I have shown preferred embodiments of my invention it is to be understood that it is susceptible of other modifications which appear obviously within the spirit of the invention and as appearing in the scope of the appended claims.

I claim:

1. In a device of the character described, means for movably supporting a blank relative to a tool, means for movably supporting a master to be duplicated on said blank, a pantograph connection between said blank supporting means and said master supporting means, a viewing screen, an optical system for projecting a magnified image of the tool on said viewing screen, and an optical system for projecting an image of said master on said viewing screen in superimposed relation to said tool image, said pantograph connection imparting relative movement between said supports in a proportion equal to the difference in magnification of the images projected on said screen.

2. In a device of the character described, a blank support, a master support, a cutting tool for working on a blank carried by said blank support, a connection between said blank support and said master support whereby movement of one will cause movement of the other, means for moving one of said supports in one direction of travel, means for moving the same support in a direction of travel at right angles thereto, color actuated devices for operating said means for moving said support, and an optical system for projecting an image of the tool and an image of the master to one of said color actuated devices.

3. In a device of the character described, means for supporting a blank relative to a tool, a master to be duplicated on said blank, interconnecting means between the master and the blank for moving the blank by movement of the master, electrically controlled means for moving the master, color actuated devices in the electrically controlled means for controlling the electrically controlled means, an optical system for projecting an image of said master and said tool on one of said color actuated devices, and means controlled by the position of said master for moving said master.

4. In a device of the class described, a support, a first rotatable shaft for moving said support in one direction, a second rotatable shaft for moving said support in a direction at right angles thereto, a reversable motor for driving each of said shafts, a differential gearing drive for each of said shafts, a constant speed motor for driving a pinion of the differential gearing, a variable speed motor for driving said differential gearing, a magnetic clutch in said shafts between said reversable motors and said differential, photo-cells for controlling an electrical circuit through said variable speed motors, and an optical system for projecting an image on said photo-cells for controlling said variable speed motor.

5. In a device of the class described, a support, a reversable motor for moving said support in one direction of travel, a constant speed motor for moving said support, a variable speed motor operating through a differential gearing for moving said support at a faster or slower speed than said constant speed motor, a plurality of photo-cells, a predetermined electrical resistance for each of said photo-cells controlling the electrical circuit to said variable speed motor, and an optical system for projecting an image of a part carried by said support to one of said photo-cells.

6. In a device of the class described, a support, a first constant speed motor for moving said support in one direction of travel, a second constant speed motor for moving said support in a direction at right angles thereto, a first variable speed motor operating through a differential gearing and in cooperation with said first constant speed motor for moving said support at a faster or slower speed than said first constant speed motor, a second variable speed motor operating through a differential gearing and cooperating with said second constant speed motor for moving said support in a direction at right angles thereto at a faster or slower speed than said second constant speed motor, a plurality of photo-cells, a predetermined electrical resistance for each of said photo-cells controlling the electrical circuit to each of said variable speed motors, and an optical system for projecting an image of a part carried by said support to one of said photo-cells and then to another photo-cell as the support is moved in any direction.

7. In a device of the character described, means for movably supporting a blank relative to a tool, means for movably supporting a master to be duplicated on said blank, a connection between said blank supporting means and said master supporting means, an optical system for projecting an image of the tool into the view of an operator, an optical system for projecting an image of said master into the view of the operator and in the same plane as the image of the tool, means for guiding said blank supporting means and said master supporting means, and automatic means controlled by movement of the master image for preventing movement of the master image beyond the tool image.

8. In a device of the character described, means for movably supporting a blank to be finished to a given size and shape relative to a tool, means for movably supporting a master of greater size than the finished blank, a connection between said blank supporting means and said master supporting means for moving said blank supporting means at a different rate of travel than said master supporting means by movement of said master supporting means, an optical system for projecting a magnified image of the cutting face of the tool and the blank into a plane where it can be viewed by the operator, an optical system for projecting an image of said master in superimposed relation on the tool cutting face image, the difference in rate of travel of said blank supporting means and said master supporting means being in proportion to the difference in size of optical magnification between said master image and said tool cutting face image, and means for moving said master supporting means.

9. In a device of the character described, means for movably supporting a blank to be finished to a given size and shape relative to a tool, means for movably supporting a master, a connection between said blank supporting means and said master supporting means for moving said blank supporting means by movement of said master supporting means, a plurality of color sensative photo-cells, an optical system for projecting an image of the cutting face of the tool on the blank on one of the color sensative photo-cells, an optical system for projecting an image of said master in superimposed relation on cutting face of the tool image, and electrical driven means controlled by said photo-cells for moving said blank and master supporting means.

10. In a device of the character described, means for supporting a blank relative to a tool for cutting engagement therewith, a master to be duplicated on said blank, interconnecting means between the master and blank for moving the blank by movement of the master, a plurality of color sensative photo-cells, driving means controlled by said photo-cells for guiding the master, means including an optical system for projecting an image of the tool contour on one of the photo-cells, and means including an optical system for projecting an image of the master on one of said photo-cells for controlling the driving means for said master.

CHARLES M. HANNUM.

References Cited in the file of this patent

UNITED STATES PATENTS

| Number | Name | Date |
|---|---|---|
| 2,116,593 | Bouvier et al. | May 10, 1938 |
| 2,248,446 | Wohlfarth | July 8, 1941 |
| 2,404,770 | Bennett et al. | July 30, 1946 |
| 2,499,178 | Berry et al. | Feb. 28, 1950 |

FOREIGN PATENTS

| Number | Country | Date |
|---|---|---|
| 614,088 | Germany | June 1, 1935 |